Figure 1:
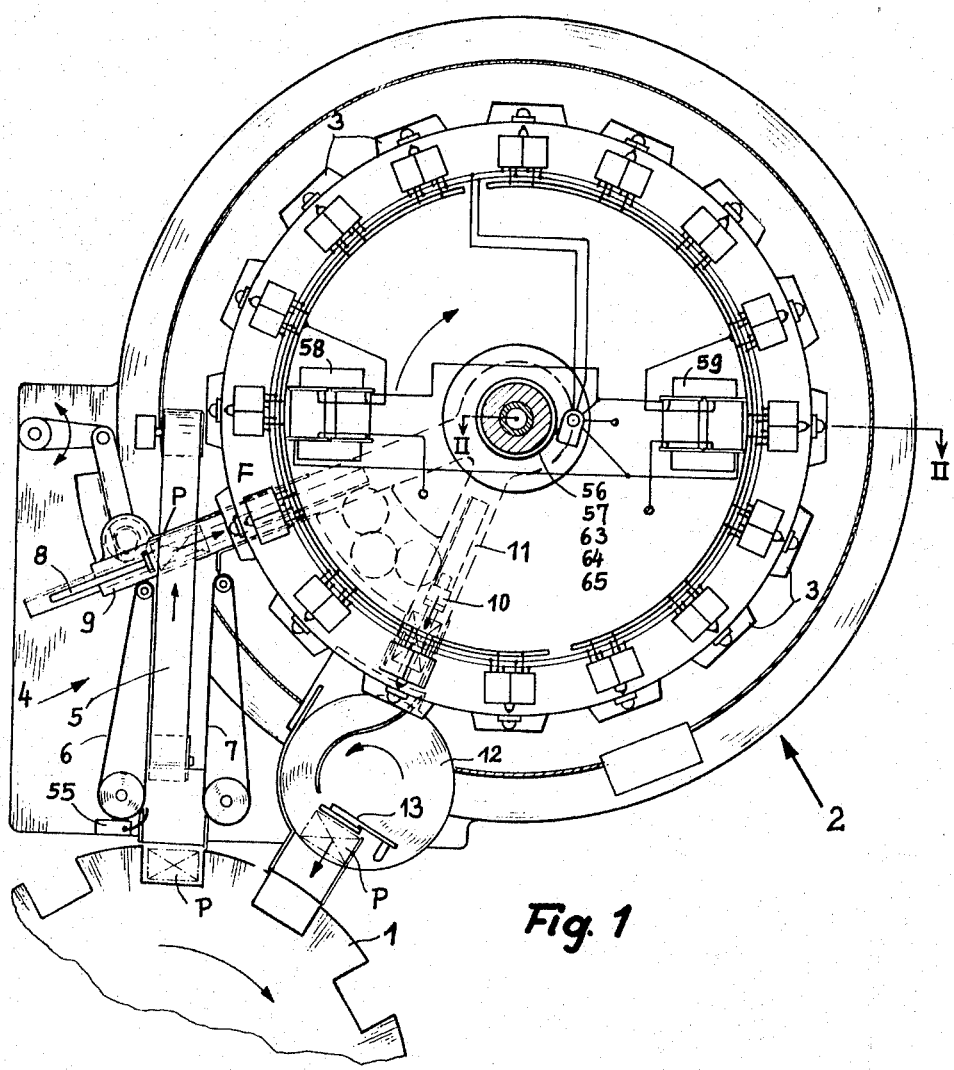

INVENTOR.
WERNER HELLRIEGEL

BY

ATTORNEY

INVENTOR.
WERNER HELLRIEGEL
BY
ATTORNEY

United States Patent Office
3,323,277
Patented June 6, 1967

3,323,277
MACHINE FOR HEAT SEALING PACKAGES
Werner Hellriegel, Stuttgart-Bad Cannstatt, Germany, assignor to Firma Fr. Hesser Maschinenfabrik A.G., Stuttgart-Bad Cannstatt, Germany, a corporation
Filed Sept. 17, 1964, Ser. No. 397,204
Claims priority, application Germany, Sept. 18, 1963, H 50,290
14 Claims. (Cl. 53—112)

This invention relates generally to packaging machines equipped with chambers for receiving packages therein which are to be evacuated or filled with a protective gas and thereafter heat sealed. More particularly, the invention concerns an improvement of the heat sealing aspect thereof.

In the prior art it is already known to utilize contact rings, or the like which are charged with a D.C. current of a certain voltage and electrically connected to the heat jaws used for sealing the packages. The rings are thus employed to cause the heat jaws to take on a pre-determined temperature.

However, devices constructed in accordance with the prior art are relatively inefficient. Thus it is known that the start-up time of the packaging apparatus is fairly long as it is necessary to delay the full operation thereof until the jaws have reached the pre-determined temperature. Whenever an interruption or temporary breakdown of the packaging operation occurs, it is again necessary to raise the temperature of the jaws. During the interruption of the operation the electric power is normally shut off with a resultant loss in heat energy. Moreover, for a safe operation of the machine it is necessary that the operation thereof immediately and automaticaly terminates upon the occurrence of trouble in, or some interference, with the electric current supply to the heating elements of the so-called heat or seal jaws, or in associated parts.

It is the primary object of this invention to provide a device overcoming the shortcomings of the prior art.

It is a further object of this invention to provide a device of the type here under consideration in which the desired temperature of the seal jaws is obtained in a comparatively short period of time after the machine has been started or re-started.

It is another object of this invention to provide a device of the type here under consideration in which any trouble in the heat seal system can be immediately observed and the operation of the machine terminated.

It is a still further object of this invention to provide a packaging machine for heat sealing packages in which the operation of the machine is so closely controlled that the number of rejects are reduced to an absolute minimum heretofore not obtainable.

One aspect of the present invention resides in the provision of a machine for heat sealing packages. The machine has a plurality of cyclically operated, air-tight sealed, chambers or housings, which continuously rotate about the axis of the machine and contain a package either filled with gas or evacuated. A seal jaw arrangement is disposed for heat healing the opening of the packages within each or at least one of the chambers. This jaw member includes an electrically responsive heat generating element. An electric circuit control system controls the flow of electric current in such a manner that a relatively increased rate of current flows to and through this element as long as this heating seal jaw provides a temperature below the desired level. When the pre-determined temperature level has been reached the flow of current is levelled off.

For a better understanding of the present invention, together with other and further objects thereof, reference is had to the following description taken in connection with the accompanying drawings and their scope will be pointed out in the appended claims.

Figure 2:
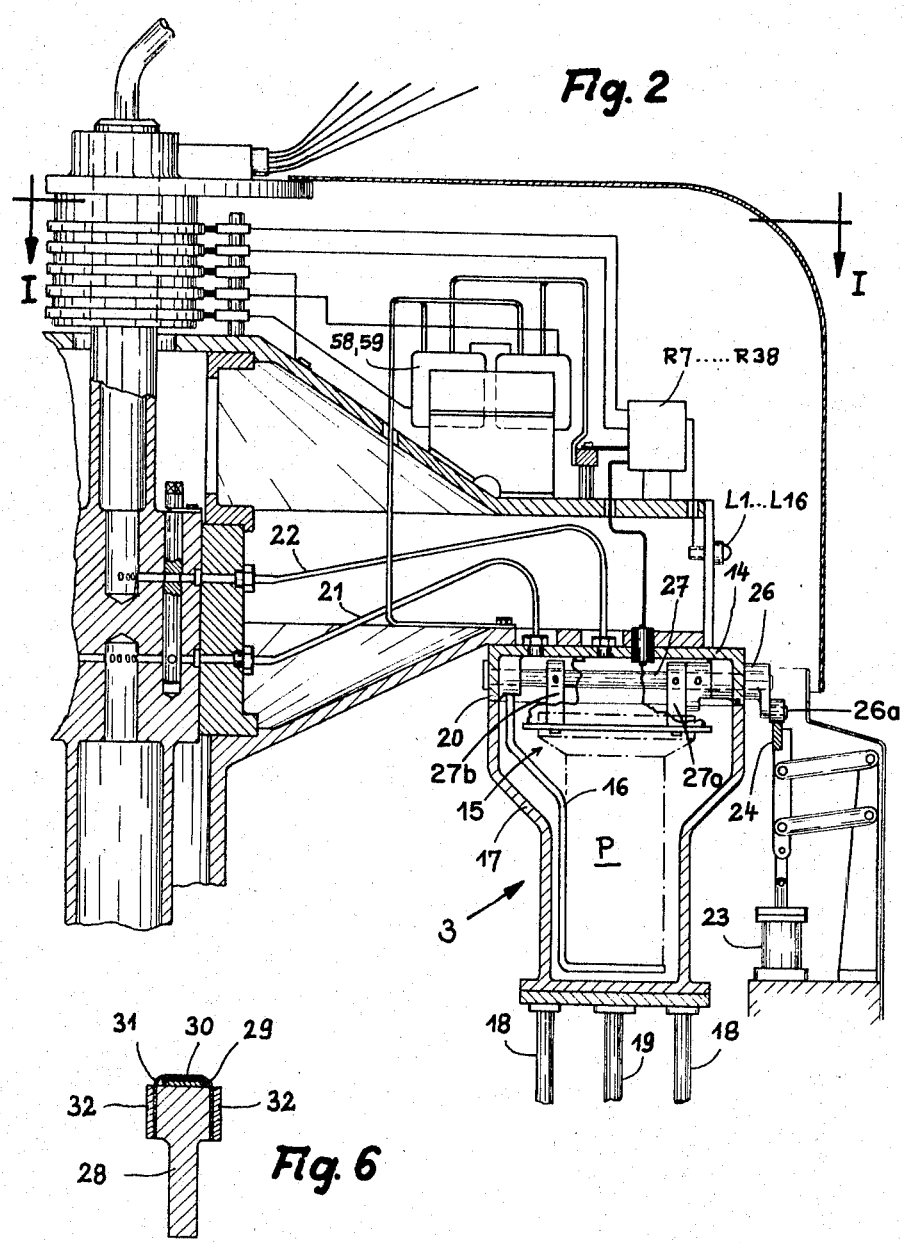
Figure 3:
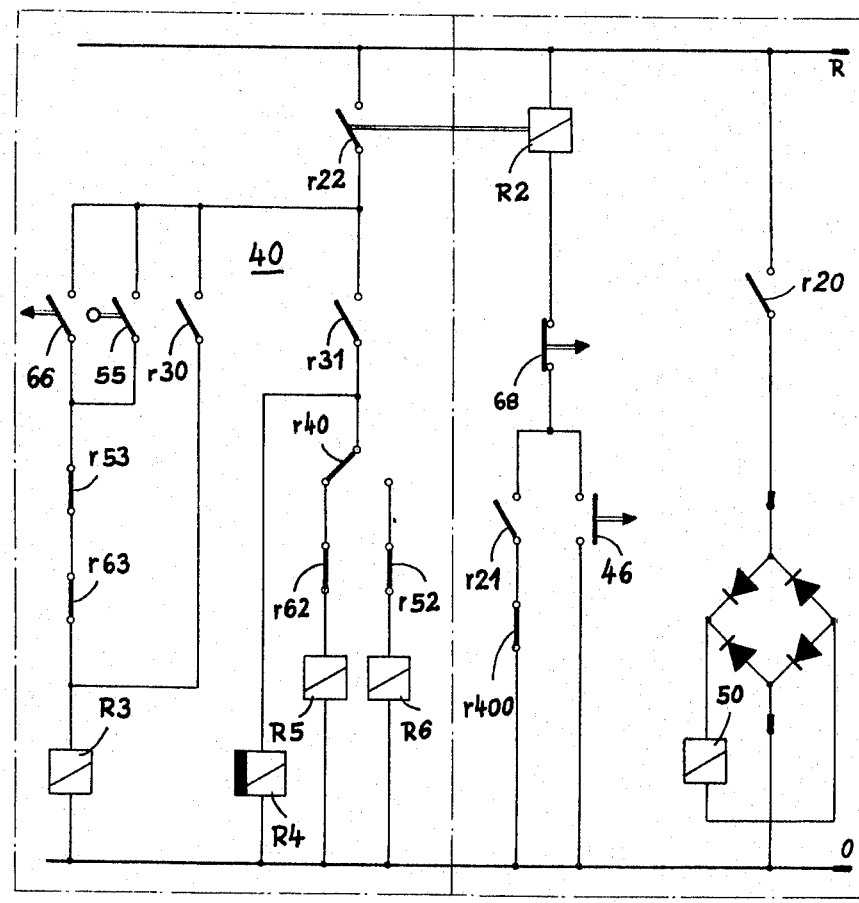
Figures 4, 5:
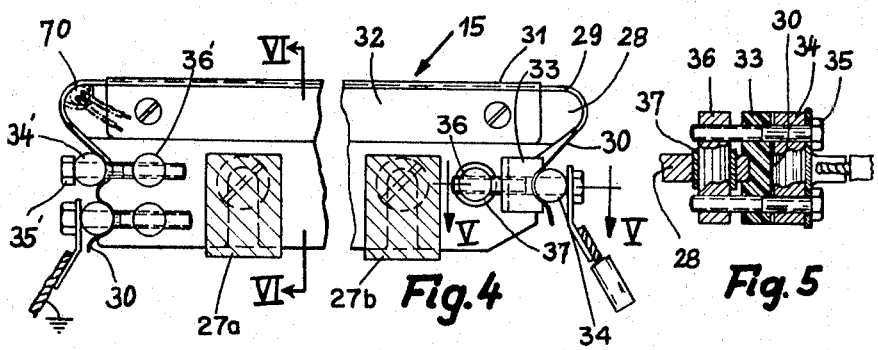
Figure 7:
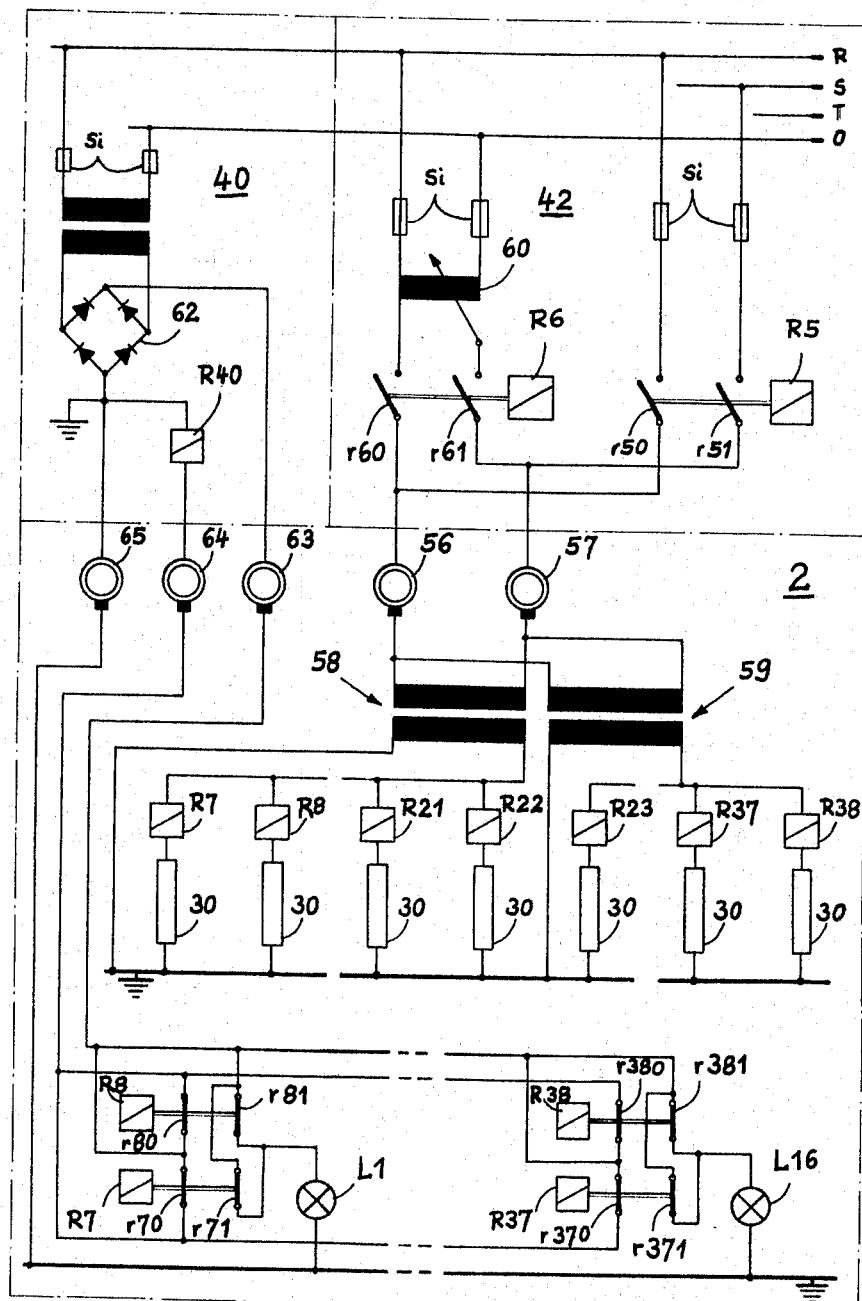

In the drawings:
FIGURE 1 is a plan view, taken at an elevation denoted by line 1—1 of FIGURE 2, and partly a diagrammatic illustration of a packaging machine for producing vacuum or protective gas filled packages;
FIGURE 2 is generally a cross-sectional view of the packaging machine taken along line 2—2 of FIGURE 1;
FIGURE 3 is a wiring diagram of the control circuit for starting the pacakaging machine and for switching the heat supply voltage;
FIGURE 4 is a plan view partly in section of a typical seal jaw;
FIGURE 5 is a cross-sectional view of the device shown in FIGURE 4 taken along line 5—5 thereof;
FIGURE 6 is another cross-sectional view of FIGURE 4 taken along line 6—6 thereof; and
FIGURE 7 is a wiring diagram of the regulator control circuit.

Referring now to FIGURE 1 there is shown part of a conventional packaging system in which filled packages P are transferred by a cyclically operating conveyor arrangement 1 to an evacuating station and apparatus 2. The apparatus 2 is provided with a plurality of chambers 3 which are suitably mounted and arranged for continuous rotation about its central axis along the outer periphery thereof.

The transfer of the packages P from the conveyor 1 to the chambers 3 of evacuator apparatus 2 is effected by a transporter device 4. The latter comprises a slidably disposed plunger (not shown) for pushing the packages P away from the conveyor means 1 and onto an adjacently located endless conveyor belt 5. The upper part of the belt is caused to move in a direction as shown in FIGURE 1. The transport of the packages at this station is facilitated by two, spacedly disposed, swiveling guide rails 6 and 7 having an essentially continuous belt-like construction. As the package arrives at station F slidably supported elongated plunger 8 is caused—by means not shown—to move the package P toward the periphery of the evacuator apparatus 2 in the direction of the center of the device 2 until the package has been turned by swivel arm 9 and pushed into a then juxtaposing chamber 3.

The removal of the evacuated packages from apparatus 2 is accomplished by a plunger 10 carried on swivel arm 11. The turntable 12 in cooperation with plunger 13 receives the package P and transfers same onto conveyor arrangement 1 for further processing.

Each chamber 3 is formed of an upper housing portion 14, see FIGURE 2, and a lower bell-like housing portion 17. The two portions, 14 and 17, are cyclically brought into engagement and sealed air-tight together, by a seal or pressure gasket 20 extending therebetween. The upper member 14 receives and carries an angularly movable shaft 27 provided with two spacedly arranged suspension bars 27a, 27b for suspending into housing member 17 a seal jaw 15 unit. In the preferred embodiment two seal jaws 15 are used and suspended in the same manner and close to each other. A bushing 26 with an eccentrically located lever 26a is securely mounted about shaft 27 proximate to but without housing portion 14. The jaw or jaws extends or extend, as the case may be, into the bell-like portion 17. A bracket 16 connected to and extending from the upper portion 16 to the lower housing portion 17 is formed to receive and support the package or carton P. The lower part 17 of the chamber 3 is supported by two guide rods 18 and a piston rod 19 actuated by a hydraulic or pneumatic cylinder (not shown) in a pre-determined manner for up and down movement.

The chamber 3 is evacuated through conduit 21 connected thereto and to a means (not shown) for pulling the vacuum. Alternatively, the chamber 3 is supplied with a protective gas through conduit 22 which is connected to the chamber 3 and a source for the gas (not shown).

After the desired conditions have been established in the chamber 3, and the bag, or package P is arranged between the jaws, the seal jaws are closed, i.e. moved relative to each other, for the purpose of sealing the opening of the bag.

The seal jaws 15 are actuated into this sealing position by a stationary, hydraulic or pneumatic, cylinder unit 23 having a rail 24 for pushing against the eccentrically located and movably mounted lever 26a of bushing 26 to move the jaws.

Referring now to FIGURES 4 and 6, there is shown a preferred construction of the seal jaws 15. The jaw comprises a rigid support member 28 having a profile as shown in FIGURE 4 and the enlarged surface of the member 28 receives a strip 29 of insulating material to insulate the member 28 from a strip of a heating element 30 tightly suspended thereagainst. In turn, at least portions of the heating strip 30 is covered with a safety layer 31 secured to the member 28 by elongated border clamps 32. The safety layer material is, for instance, formed of a glass mat and tetrafluoroethylene.

FIGURE 5 illustrates that one end of the elongated heating strip 30 is insulated from and secured to the profile member 28. More particularly, there is shown an insulating block 33 and a cylindrical retaining part 34. A couple of screws 35 protrude transversely through the block 33 and part 34 and engage a similarly arranged cross-bolt 36 to tighten the two former parts against the latter. The bolt 36 is seated within an aperture of profile member 28 with a suitable bushing 37 of insulating material being interposed therebetween.

The other end of the heating strip 30 is conductively secured between the support member 28 and two units of the aforedescribed retaining cylinder 34′, screws 35′ and bolt 36′ so that any slack or tension in the heating element may be suitably adjusted.

The distribution of electric current is regulated by a control mechanism 40. The current used herein is uniform and of a pre-determined voltage as hereafter further described. In accordance with this invention, at the start of the operation the temperature of heating elements 30 is rapidly brought to the desired level. Thereafter only that amount of electrical energy is supplied to the heating elements which will maintain the proper temperature during the continuous operation of the machine. The work process of the control mechanism 40 is hereafter described in conjunction with starting and operating the machine.

Referring now to the drawings and in particular to FIGURES 3 and 7, the packaging machine is driven by a motor and an electromagnetic clutch 50 associated therewith. The clutch is brought into engagement by a pressure contact 46 placed in working relation to a relay R2. The contacts r20, r21 and r23 of the relay close the electrical circuit to the clutch, the self-holding circuit for the relay and the circuit for the control mechanism 40.

The machine now begins to perform its task of forming and filling the packages P. After the first package has been filled and moved along conveyor 1 and transferred to evacuator apparatus 2, the package passes a scanner having a contact 55 and causes the latter to be closed. The closed contact 55 permits the circuit to auxiliary relay R3 to be energized. The relay R3 is maintained in this condition by vitrue of connecting to self-retaining contact r30, so that it does not fall back to its original position after the package P has passed the scanner 55.

Simultaneously with actuating the self-retaining contact r30 the contact r31 is also closed whereby voltage is applied to relay R5 for switching on the pre-heat current.

The energization of relay R5 causes the contacts r50 and r51 in electrical mechanism 42 employed for the heat supply to be closed and the contact r52 to be opened. As a result, the contacts r50 and r51 and two contact rings 56 and 57 facilitate a connection between two heat-current supply transformers 58, 59 and the main circuit.

The relay R4 is energized in accordance with a pre-determined delay and thereafter switches the contact r40 in such manner so that instead of relay R5 a relay R6 can be energized for permanent heating. This condition occurs as soon as the relay R5 has been released and the contact r52 closed. The transformers 58 and 59 are now no longer connected to the general circuit over contacts r50 and r51. Instead they now connect over contacts r60 and r61 and control transformer 60 in reserve position to the circuit. The relay R6 is provided for safety with contact r62 which now opens.

One pole of each secondary winding of the heat-current transformers 58, 59 is connected to ground. The second pole of each transformer 58, 59 is brought into contact with the control relays R7 to R38, see FIGURE 7, conducted through these relays and then in each case coupled to the insulated end, see member 33 FIGURE 4, of the heat elements 30 and finally to ground. The current conducted during the operation through relays R7 to R38 effects excitation thereof and causes the contacts r70, r71, r80, r81 to r370, r371, r380 and r381 to open to warm up the heat strip 30.

In the event a heating strip 30 burns through, preventing current to flow through the relay associated therewith, the particular relay is caused to be released. Because of this occurrence, the contacts belonging to the affected relay are closed. Therefore, the current passing through rectifier 62 from the two contact rings 63 and 65 and the above mentioned contacts, is conducted through control lamps L1 to L16. In accordance with the present invention one control lamp is arranged together with each of the heating strips 30. The current is also conducted over another contact ring 64 and through the control relay R40 against zero. The particular lamp thus indicates that the chamber 3 associated therewith contains a defective heating element. For instance, in the event of a defect in the element 30, or related parts, associated with relay R7, which in turn is coupled to the heat-current transformer 58, the contact r71 is closed and the lamp L1 lights up. The energization of relay R40, which for example receives the excitation current through the closed contact r70, causes the opening of contact r400 in the self-retaining circuit of relay R2. Therefore, a burned out heating element 30 effects the release of contacts r20 and with it stops the operation of the packaging machinery.

The operation of the machine may also be terminated independent of the aforedescribed process by opening push button contact 68 whereby the relay R2 is released.

In order to re-start the heating cycle only when the circuit has been previously completely tuned off, in other words the relays R5 and R6 are in a de-energized condition, contacts r53 and r63 are provided in the circuit of auxiliary relay R3.

In case the machine has been turned off with some packages still remaining in the evacuator 2, but with no further packages actuating the scanner 55, there is provided parallel to the scanner 55 a push button contact 66 by means of which at re-start time of the machine the heating elements 30 can be rapidly brought again to the desired temperature. This assures proper sealing of the packages still remaining in the chambers 3.

The supply current for the permanent heating of elements 30 is controlled by the regulator transformer 60. The transformer is set so that at the desired sealing temperature the supply of electrical energy substantially equals the loss of heat for sealing the package as well as the normal losses, for instance such as occur due to radiation. For pre-heating it is merely necessary to apply an increased voltage, for example in the magnitude of 380 volts, to the transformer 58, 59. The temperature level at the heating strips is thus determined by choosing a certain length of time for the pre-heat period. The relay R4 is used for this purpose. The relay, after the pre-determined time, switches the transformer 60 ahead of the transformers 58, 59. The latter transformers operate then under a substantially reduced voltage, for instance 180–200 volts, which corresponds to the current required for continuous heating.

It is of course also possible to substitute for transformer 60 a standard transformer provided with means for connecting to a higher power supply voltage.

Another modification of this invention resides in the embodiment in which heat-current supply transformers 58, 59 or pairs of the heating strips 30, are placed parallel during the pre-heat period and thereafter during permanent heating are switched and placed in series.

Each system 40 and 42 is secured by conventional fuse elements denoted by letters Si.

For the contingency that foils are used for or in conjunction with the packages whose welding must be accomplished at a very narrow temperature range, the packaging machine may be provided with a plurality of heat sensors 70 of a conventional nature. A heat sensor 70 is shown in outline form in FIGURE 4, protruding through member 28 in close proximity to heating strip 30. The sensor 70 regulates the heat voltage or current in a conventional manner using amplifiers and relays to effect that the pre-determined temperature is properly maintained.

A regulating system using such heat sensors 70 can also be adapted for controlling the pre-heat cycle. Under these conditions the pre-heat cycle is not limited timewise but rather is dependent upon and controlled by the sensor determined temperature. The relay R4 may then be eliminated as well as scanner 55 including the relay R3 associated therewith. Such a system again operates so that at substantial differences between the existing and the desired temperature, for instance at the start of operating the machine, the fast heat or pre-heat cycle is rapidly established until the temperature has reached the desired level. Thereafter the system is switched to the permanent heating. Smaller temperature variations during permanent heating may be adjusted by the sensor controlled regulating resistors or regulating transformers in a known and conventional manner.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a machine for heat sealing packages having a plurality of cyclically operated, air tight sealed, chambers and packages therein filled with gas or evacuated, comprising, in combination:

seal jaw means disposed for heat sealing the packages within one of the chambers, said means including a heat generating element responsive to electrical energy;

first independent transformer means and second independent transformer means for supplying electrical energy to said element, and means associated with the first and second means for controlling the flow of electric current, said first transformer means being effective for establishing a relatively increased rate of current flow in the circuit leading to and through said element as long as said seal jaw means establishes a temperature below a predetermined level;

said second transformer means being effective for establishing a comparatively reduced rate of electric current flow in said circuit to and through said element to maintain said element above said predetermined temperature level;

and electrically responsive switch means associated with said first and second means for alternatively connecting either of said means to said heat generating element.

2. A machine according to claim 1, and control means for electrically cooperating with the circuit of said first and second means, and effective to impress a relatively higher voltage to the first mentioned circuit during a predetermined period of time beginning immediately subsequent to starting the operation of the machine and impressing thereafter a comparatively lower voltage through the latter circuit.

3. A machine according to claim 2, and a heat sensor located in suitable proximity to said element and electrically coupled to said circuit for sequentially actuating the last mentioned control means.

4. A machine according to claim 3, and means for feeding the packages to the chambers and including an electrically responsive scanner, an electric circuit including a switch relay and a time relay coupled to said element and said scanner; said scanner being effective upon actuation thereof to energize said relays and cause said relays to impress a relatively high voltage to the circuit of said element and after a predetermined time reducing said voltage to a comparatively lower level.

5. A machine according to claim 3, wherein said seal jaw means includes a support member having a profile for receiving an elongated heat generating strip responsive to the application of electrical energy, insulating means for securing one end of the strip to said support, and a tension adjustment member for adjustably securing the other end of the strip to said support.

6. In a machine for heat sealing packages having a plurality of cyclically operated, air tight sealed, chambers and packages therein filled with gas or exacuated, comprising, in combination: seal jaw means disposed for heat sealing the packages within one of the chambers, said means including a heat generating element responsive to electrical energy; first and second means for supplying electrical energy to said element and for controlling the flow of electric current thereto, said first means being effective for establishing a relatively increased rate of current flow in the circuit leading to and through said element as long as said seal jaw means establishes a temperature below a predetermined level; said second means being effective for establishing a comparatively reduced rate of electric current flow in said circuit to and through said element to maintain said element above said predetermined temperature level; said first and second means each including at least one main transformer, at least one intermediate relay and at least one switch relay, said switch relay being adapted to connect the primary winding of the transformer by way of said intermediate switch to a power supply voltage; and electrically responsive switch means associated with said first and second means for alternatively connecting either of said means to said heat generating element.

7. In a machine for heat sealing packages having a plurality of cyclically operated, air tight sealed, chambers and packages therein filled with gas or evacuated, comprising, in combination: seal jaw means disposed for heat sealing the packages within one of the chambers, said means including a heat generating element responsive to electrical energy; first and second means for supplying electrical energy to said element and for controlling the flow of electric current thereto, said first means being effective for establishing a relatively increased rate of current flow in the circuit leading to and through said element as long as said seal jaw means establishes a temperature below a predetermined level; said second means being effective for establishing a comparatively reduced rate of electric current flow in said circuit to and through said element to maintain said element above said predetermined temperature level; electrically responsive switch means associated with said first and second means for alternatively connecting either of said means to said heat generating element; and a relay electrically associated with said element for sensing an interruption in the circuit leading to and through said element and effective to stop the operation of the machine in response to an interruption in said circuit.

8. A machine according to claim 7, and circuit trouble indicator means responsive to actuation of said relay.

9. In a machine for heat sealing packages having a plurality of cyclically operated, air-tight sealed, chambers and packages therein filled with gas or evacuated, comprising, in combination: means for feeding the packages to the chambers including an electrically responsive scanner; seal yaw means including an electrically responsive heat generating element disposed within the chamber; an electric circuit including a switch relay and a time relay in contact with said element and scanner; said scanner being effective upon actuation thereof to energize said relays and cause said relays to impress a relatively high voltage to the circuit of said element and after a pre-determined period of time reducing said voltage to a comparatively lower level.

10. A machine according to claim 9, and a relay electrically associated with said element for sensing an interruption in the circuit existing therebetween and effective to stop the operation of the machine.

11. A machine according to claim 9, wherein said circuit includes at least one main transformer and at least one intermediate relay, and wherein said switch relay is adapted to connect the primary winding of said transformer by way of said intermediate switch to a power supply voltage.

12. A machine according to claim 9, and a manually operated elecrically responsive pressure contact disposed electrically in parallel to said scanner and effective for switching the said higher voltage to the circuit of said element.

13. A machine according to claim 11, and said circuit including an adjustable transformer also connected to the main power supply voltage, and another intermediate relay for selectively coupling the primary winding of said main transformer to the secondary winding of the adjustable transformer.

14. A machine according to claim 3, said circuit including at least one relay associated with said sensor and responsive to signals from said sensor for switching the circuit to said element from a low to a comparatively high voltage and vice versa upon the occurrence of a pre-determined temperature condition.

References Cited

UNITED STATES PATENTS

| 2,749,686 | 6/1956 | Lorenz et al. | 53—112 X |
| 2,963,838 | 12/1960 | Harrison et al. | 53—112 X |
| 3,006,120 | 10/1961 | Grafing-Holt | 53—112 X |
| 3,157,975 | 11/1964 | Altman | 53—379 |
| 3,164,938 | 1/1965 | Waite | 53—379 |

TRAVIS S. McGEHEE, *Primary Examiner.*